US00H002179H

(19) United States
(12) Statutory Invention Registration
Egan

(10) Reg. No.: US H2179 H
(43) Published: Feb. 6, 2007

(54) MAXIMUM ENTROPY BASED IMAGE COMPRESSION AND RECONSTRUCTION PROCESS

(75) Inventor: Michael P. Egan, Alexandria, VA (US)

(73) Assignee: The United States of America as represented by the Secretary of the Air Force, Washington, DC (US)

(21) Appl. No.: 10/230,441

(22) Filed: Aug. 28, 2002

(51) Int. Cl.
*G06K 9/36* (2006.01)

(52) U.S. Cl. ..... 382/232

(58) Field of Classification Search ..... 382/232, 382/233, 248; 348/395.1; 358/426.14; 375/240.08, 375/240.18; 708/203
See application file for complete search history.

(56) References Cited

U.S. PATENT DOCUMENTS 6,169,820 B1 * 1/2001 Wade et al. ..... 382/239

OTHER PUBLICATIONS

M. Vicanek et al. "Two–Group Approach to the Kinetics of Particle Cluster Aggregation," J. Computing Physics, vol. 101, No. 1, Jul. 1992, pp. 1–10.*

G.A. Papakostas et al., "Image Coding Using a Wavelet Based Zernike Moments Compression Technique," 14th Int'l Conf. on Digital Signal Processing, vol. 2, Jul. 1–3, 2002, pp. 517–520.*

* cited by examiner

*Primary Examiner*—Daniel Pihulic
(74) *Attorney, Agent, or Firm*—William G. Auton

(57) ABSTRACT

A process is disclosed for compression and reconstruction of digital images taking advantage of information entropy properties to reconstruct image data from minimal information. The algorithm yields the possibility of achieving image compression factors of 10,000 to 100,000, thus decreasing the necessity of high bandwidth transmission modes for image data. The algorithm also has cryptographic properties which offer secure transmission of image data over non-secure data lines.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MAXIMUM ENTROPY BASED IMAGE COMPRESSION AND RECONSTRUCTION PROCESS

STATEMENT OF GOVERNMENT INTEREST

The invention described herein may be manufactured and used by or for the U.S. Government for governmental purposes without the payment of any royalty thereon.

BACKGROUND OF THE INVENTION

The present invention relates generally image reconstruction and more specifically to a process for reconstruction of digital images that takes advantage of information entropy properties.

Lossy image compression algorithms are currently used in order to minimize storage requirements and transmission bandwidth requirements for digital image data. "Lossy" compression schemes stand in contrast to "lossless" compression in that lossless compression yields a reconstructed image which is identical to the original image. Lossy compressions reinflate to an image which has some degradation. The advantages of lossy compression over lossless compression is that much higher compression fractions can be achieved with lossy schemes. Further, to the human eye, little or no loss can be perceived, which makes lossy compression adequate for may uses.

Current compression algorithms gain reductions in the amount of data storage required by taking advantage of redundant information in the original image. These redundancies can be in spatial or spectral domains, or in the time domain in video applications where multiple frames are being sent.

Examples of current image compression and reconstruction algorithms and systems are shown in the following U.S. Patents, the disclosures of which are incorporated herein by reference:

U.S. Pat. No. 6,054,943, Apr. 25, 2000, Multilevel digital information compression based on Lawrence algorithm, Lawrence, John Clifton, U.S. Pat. No. 6,298,162, Oct. 2, 2001, Image compression/expansion using parallel decomposition/recomposition, Sutha, Surachai, U.S. Pat. No. 6,259,819, Jul. 10, 2001, Efficient method of image compression comprising a low resolution image in the bit stream, Andrew, James Phillip, U.S. Pat. No. 6,212,301, Apr. 3, 2001, Systems and methods for digital image compression, Warner, Scott J.

U.S. Pat. No. 6,243,420 B1, Mitchell et al; U.S. Pat. No. 6,222,884, Mitchell et al; U.S. Pat. No. 6,198,842 B1, Yeo et al. All of the patents are related and refer to methods to perform multi-spectral (i.e. multi color) image compression. The "new art" described in all three is the method to compress multiple color planes into a single plane. The actual compression of single plane images relies on methods not included in the patent. As described, the patents suggest using the JPEG standard. The maximum entropy method I describe is a method suitable for single color plane images, and could be used with these patents in place of the JPEG or GIF standards as the single plane image compressor.

U.S. Pat. No. 6,208,754 B1, Abe. The patent presents a device that combines three-color data into a single image pixel. The resulting single plane image is then expected to be compressed using an extant technique, such as JPEG compression. As is the case the Mitchell et al and Yeo et al patents, the maximum entropy method could be used in place of the JPEG compression with this device.

U.S. Pat. No. 6,295,379 B1, Goldstein et al. The method concentrates on a technique primarily for transmission of digital video. The image compression technique differs from the maximum entropy method of the present invention in that it concentrates on a line-by-line compression of images, where the present method compresses the entire image at once.

U.S. Pat. No. 6,201,614 B1, Lin. This patent is for a codebook method to compress dithered images relating gray scale levels in dithered images to a codebook entry. The present invention uses no codebooks, nor is it limited to dithered images.

U.S. Pat. No. 6,226,445 B1, Abe. The patent is for a device which allows JPEG compression (or any compression relying on discrete cosine transforms (DCTs)), and incorporates copy-protection properties and password protection into the ability to decompress the images. The maximum entropy method does not use DCTs.

U.S. Pat. No. 6,212,301 B1, Warner et al. The method presents a line-by-line image compression method, which allows for progressive/iterative improvement of the image as it is transmitted. The maximum entropy technique by contrast compresses the entire image at once, allowing for greater image compression than line-by-line methods are capable of.

U.S. Pat. No. 6,298,162 B1, Sutha et al. Compression method for massively parallel computers. Method assumes an image compression technique which uses subsampling of the images, which yields advantages for parallel computing in that each subsample can be acted on by a separate processor. The maximum entropy method described in the present invention does not subsample image pixels, and is not improved by using parallel computers.

The standard in lossy compression schemes for image data is the JPEG (Joint Photographic Experts Group) algorithm. This is an algorithm based on the Discrete Cosine Transform (DCT) and typically achieves compression ratios of 20:1. Other lossy techniques include wavelet transforms, vector quantization, and fractal compression. Wavelet transform compression algorithms are similar but make use of the discrete wavelet transform (DWT) rather than the DCT. The DWT tend to have improved compression properties over DCT schemes, allowing compression factors of 100:1 with fairly mild image degradation. Also, DWT schemes are more robust against transmission and decoding errors than DCT schemes. Vector quantization (VQ), is a technique which maps blocks of pixels (subsets of the image) to similar blocks defined in a "codebook" library. Typically compression ratios of ~50:1 are achieved by this method. Fractal compression is a special case of VQ, where the codebook is virtual and made up of fractals from Iterated Functions Systems (IFS). These fractal subimages then map the various scales, from large to small, making up the entire image, the implementation of which is known as Partitioned Iterated Function Systems (PIFS). Fractal compression offered the possibility of 10,000:1 compression ratios, but was very costly (hundreds of hours) in computer time to encode. In practice, for non-contrived images, compression ratios from 4:1 to 100:1 have typically been achieved.

SUMMARY OF THE INVENTION

The present invention is a digital image compression and reconstruction process that uses an algorithm for compression and reconstruction of digital images taking advantage of information entropy properties to reconstruct image data from minimal information. The algorithm yields the possibility of achieving image compression factors of 10,000 to 100,000, thus decreasing the necessity of high bandwidth transmission modes for image data. The algorithm also has cryptographic properties which offer secure transmission of image data over non-secure data lines.

The process for each of N functions for N+1 moments of size distribution image data for $(i,j)^{th}$ pixel is $I_{ij}$ for the continuous function W (x,y) using $$\langle E\rangle_k = \sum_i \sum_j I_{ij} W_{ijk}$$

where the information entropy equation becomes $$S \equiv \sum_i \sum_j I_{ij} \ln \frac{I_{ij}}{p_{ij}}$$

where pij is now the prior value of the $I,j^{th}$ pixel. In practice, these will likely be set to unity.

After the compressed image is transferred over a media to a receiver, the reconstructed image pixel values $I'_{ij}$ are determined using the Lagrange multipliers $\lambda_k$, as $$I'_{ij} = p_{ij} \exp\left[-\sum_{k=1}^{N} \lambda_k W_{ijk}\right]$$

The values of the Lagrange multipliers are determined from the solution of the set of N equations, $$\langle E\rangle_k = \sum_i \sum_j \exp\left[-\sum_{n=1}^{N} \lambda_n W_{ijn}\right] W_{ijk} = 0,$$

for $k = 1, 2, \ldots N$

DETAILED DESCRIPTION OF THE PREFERRED EMBODIMENT

Figure 1:
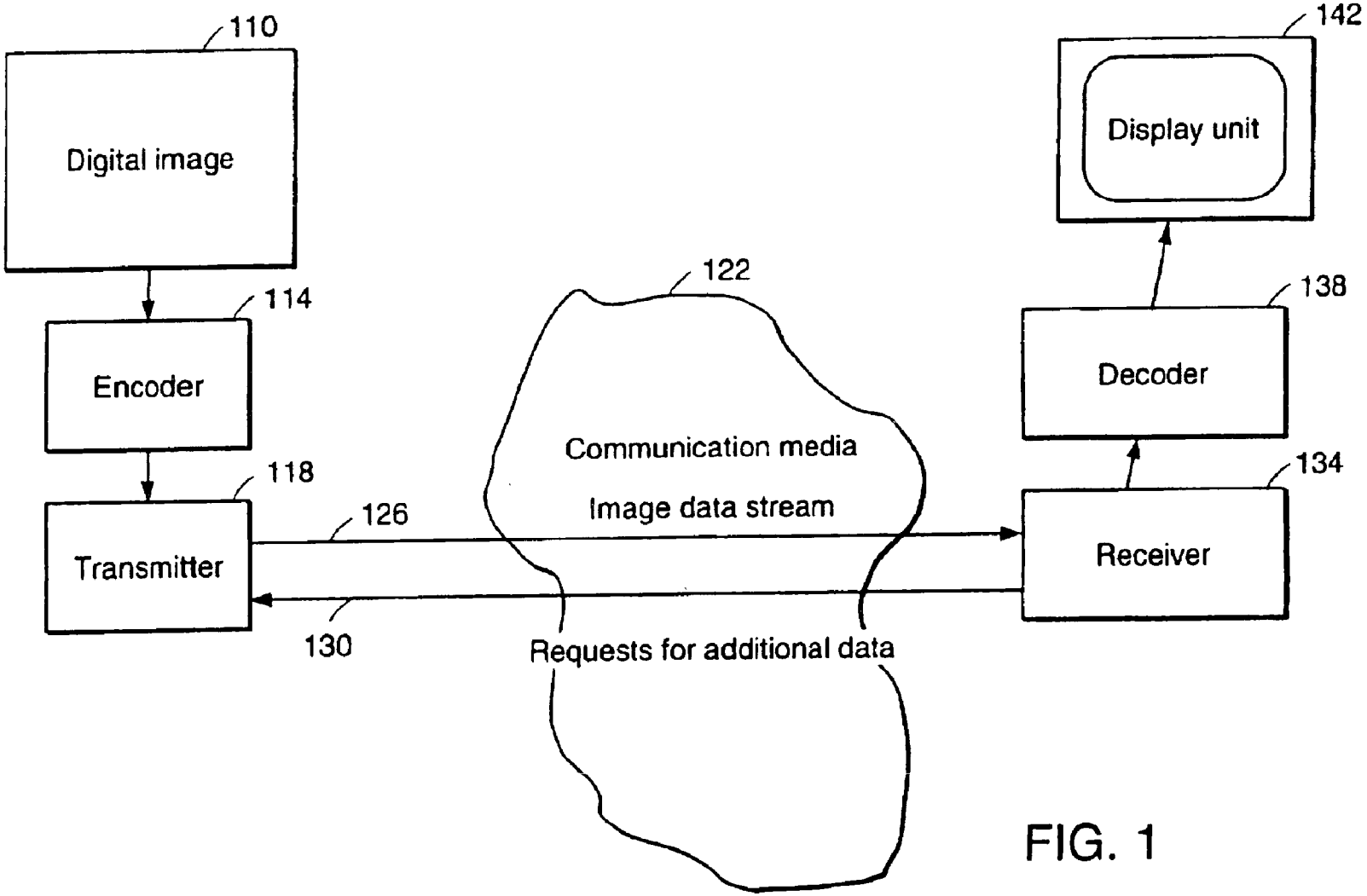
FIG. 1 is an image compression, transmission and reception system that uses the process of the present invention.

The invention is a new process for the compression and reconstruction of digital image data. The method takes advantage of information entropy properties, and maximum entropy reconstruction techniques to reconstruct image data from minimal information. The algorithm allows the achievement of image compression ratios of 10,000:1 to 100,000:1, thus decreasing the necessity of high bandwidth transmission modes for image data. The algorithm also has cryptographic properties which will allow the secure transmission of image data over non-secure data lines.

FIG. 1 depicts a functional block diagram of the components in one system that uses the invention. FIG. 1 includes a digital image 110, an encoder 114, a transmitter 118, a communications media 122, an image data stream 126, requests for additional data 130, a receiver 134, a decoder 138, and a display unit 142.

The digital image 110 is an original, uncompressed image composed of lines or rows of data. Typically the image 110 is a bi-level or two-tone image, such as white and black, in which the rows of data are composed of bits of data with 0 and 1 values. In one embodiment of the invention, the image may also be part of a multicolor image, in which the image 110 referred to in FIG. 1 is one bit plane in the multicolor image, each bit plane representing one color value. For example, a color image can be composed of 8 bit planes representing 8 basic colors in the image. In one embodiment of the invention, and encoder 114 compresses each bit plane as though it were an image 110.

The encoder 114 is a device or computer program that compresses the image 110. The encoder 114 passes a compressed portion of the image 110 to the transmitter 118 as an image data stream 126. The image data stream 126 is a continuous stream of data that the transmitter 118 transmits sequentially through a communications media 122 to a receiver 134.

The communications media 122 is any media suitable for transmitting electronic data, including, but not limited to, electronic wire or cable or optic cable. In other embodiments, the communications media 122 may be based on any suitable part of the electromagnetic spectrum, such as visible light, infrared, microwave, or radio wave transmissions. In further embodiments, the communications media 122 is based on any communications media suitable for transmitting an image data stream of bits from one location to another. The communications media 122 may be a connection over a local computer network, such as a LAN, or a global computer network, such as the Internet.

The receiver 134 is a device or computer program that receives the image data stream 126 and passes it to the decoder 138. The decoder 138 decompresses the image data stream 126 that it has received and produces an uncompressed image for display after the algorithms described below are used by receiver 134.

Vicanek and Ghoniem (*J. Comp. Phys.* 1992. 101, 1) developed a maximum entropy technique to reconstruct particle size distributions if the moments of the distribution function were known. Their method reconstructs particle size distribution from N+1 moments of the size distribution, plus a constraint on the minimum particle size. The $k^{th}$ moment of the particle size distribution f(a) is given by $$M_k = \int_{a_{\min}}^{\infty} f(a) a^k \, da. \tag{1}$$

If the upper limit of particle size is also constrained, the moment equations become $$M_k = \int_{a_{\min}}^{a_{\max}} f(a) a^k \, da. \tag{2}$$

The Air Force Research Laboratory and the Ballistic Missile Defense Organization developed a generalized form of this method, for expectation values in general, such that $$\langle E\rangle_k = \int_{a_{\min}}^{a_{\max}} f(a) W_k(a) \, da \tag{3}$$

for any set of N+1 arbitrary functions $W_k(a)$.

While a finite set of measurements, $\langle E\rangle_k$, do not provide sufficient information to uniquely determine the underlying function, a few measurements with different $W_k(a)$ do constrain f(a) to a limited class of functions. Of these, we are interested in finding that which best fits our sample of measurements. As Vicanek and Ghoniem note, the most general nonlinear reconstruction method available is the maximum entropy approach, which "provides the means to select an unbiased estimate, in the sense of Bayes, of the distribution, given only the incomplete information of a finite set of expectation values (moments)".

The heart of the method lies in maximizing the information entropy, S, where $$S \equiv \int_{a_{\min}}^{\infty} f(a)\ln\frac{f(a)}{p(a)}da, \tag{4}$$

where f(a) must satisfy the expectation value constraints. The function p(a) represents the prior probability or measurement, of the state (a,a+da). In our case, we do not know the a priori probability of a state being filled, so we set p(a)=1. Maximizing this entropy by introducing Lagrange multipliers, $\lambda_k$, for the k expectation values (0 to N) one finds the result $$f(a) = p(a)\exp\left(-\sum_{k=0}^{N}\lambda_k a^k\right) = \exp\left(-\sum_{k=0}^{N}\lambda_k a^k\right), \tag{5}$$

in the case where we are using moments of the size distribution, and $$f(a) = p(a)\exp\left(-\sum_{k=0}^{N}\lambda_k W_k(a)\right) \tag{6}$$

in the general case. The Lagrange multipliers are determined from the constraints by solving the non-linear systems of equations $$M_k - \int_{a_{\min}}^{a_{\max}}\exp\left(\sum_{i=0}^{N}\lambda_i a^i\right)a^k da = 0,\ k = 0, 1, \ldots, N \tag{7}$$

for moments, or $$\langle E\rangle_k - \int_{a_{\min}}^{a_{\max}}\exp\left(-\sum_{i=0}^{N}\lambda_i W_i\right)W_k da = 0,\ k = 0, 1, \ldots, N. \tag{8}$$

if we consider a generalized scheme. We solve this numerically with a modified Powell's hybrid algorithm.

Extending the above arguments from the one-dimensional particle size distribution to a two-dimensional general problem, the method lends itself to image compression. In the case of images, the data, which replaces the size distribution function f(a) in the one-dimensional case above, is discrete pixel data rather than a continuous functions. I may write the image data for the $(i,_j)^{th}$ pixel as Iij. Likewise, the generalized compression functions must two-dimensional. These functions will most likely be analytic, continuous functions, W(x,y). However, at each pixel the functional value Wij can be calculated. The number of weighting functions required, N, will depend on the degree of compression required and the amount of image degradation (in the spatial frequency domain) which can be tolerated in the reconstructed image. The counterpart to equation (3) above for the image compression algorithm is $$\langle E\rangle_k = \sum_i\sum_j I_{ij}W_{ijk}.$$

where $w_{ijk}$ is defined as $W_k(i,j)$.

The information entropy equation becomes $$S \equiv \sum_i\sum_j I_{ij}\ln\frac{I_{ij}}{P_{ij}} \tag{10}$$

where $p_{ij}$ is now the prior value of the $i,j^{th}$ pixel. In practice, these will likely be set to unity. The reconstructed image pixel values, $I'_{ij}$, following the form of Eqn. (6) can now be written using the Lagrange multipliers, $\lambda_k$, as $$I'_{ij} = p_{ij}\exp\left[-\sum_{k=1}^{N}\lambda_k W_{ijk}\right]. \tag{11}$$

(Note that k=1, . . . , N is now being counted. In the particle size distribution case, the numbering k=0, . . . , N was an artifact of needing the zeroeth moment for particle size distribution.) As before, the values of the Lagrange multipliers are determined from the solution of the set of N equations, $$\langle E\rangle_k = \sum_i\sum_j\exp\left[-\sum_{n=1}^{N}\lambda_n W_{ijn}\right]W_{ijk} = 0, \tag{12}$$

for $k = 1, 2, \ldots N$

Prior to compressing images and reconstruction them, the N compression functions $$W_k(x,y) \text{ for } k=1,2, \ldots N \tag{13}$$

must be developed. The number of compression functions needed will depend on (1) the degree of compression required, (2) the amount of spatial frequency degradation (loss) to be tolerated, and (3) the degree to which the compression functions being used can capture information at all spatial frequencies.

Image Compression: Following the development of the N Compression functions, to compress and transmit the image perform the calculation described in Eqn. (9), in order to calculate the N expectation values $$\langle E\rangle_k = \sum_i\sum_j I_{ij}W_k(i, j) = \sum_i\sum_j I_{ij}W_{ijk}$$

for $k = 1, 2, \ldots N$.

For a typical 8-bit image, the required N will be between 10 and 100. For a 1024×1024 pixel image, which, uncompressed, would require 1,048,576 bytes of data transmission or storage, this would result in a compression factor of between 100,000 and 10,000.

Image Transmission: From sender to receiver, the N values of <E> would be transmitted for each frame of data. It is assumed that both sender and receiver have the identical compression functions resident with their compression/re-inflation software.

Image Re-Inflation: Upon receipt of the set of expectation values for a compressed image, the re-inflation software would first determine the Lagrange multipliers, $\lambda_k$ for k=1 to N, by solving the set of N equations described in Eqn. (12) above. Following this, the re-inflation software will solve Eqn. (11), resulting in the reconstructed image $I'_{ij}$. Again, the compression functions, $W_{ijk}$ for k=1,2, . . . N, must be identical to those used in the image compression step.

This algorithm maximizes image compression, in order to make maximum use of limited transmission bandwidth. The re-inflation step is computationally intensive, but in the current bandwidth and computation environment, bandwidth is expensive, but computing power is relatively cheap. The method presented here will allow real time encoding, and re-inflation which takes seconds.

The algorithm also has interesting cryptographic properties. The compression functions are like cryptographic keys held by both the compressor and re-inflator. If these functions are held only by parties, it would be difficult or impossible for a third party to reconstruct the images.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A digital image compression, transmission and reconstruction process comprising the steps of:

Compressing a digital image in which image data for $i^{th}$ and $J^{th}$ pixel is Iij for a continuous function W(x,y) using $$\langle E\rangle_k = \sum_i \sum_j I_{ij} W_{ijk}$$

Where information entropy equation becomes $$S \equiv \sum_i \sum_j I_{ij} \ln \frac{I_{ij}}{p_{ij}}$$

And where pij is a prior value of the $i,j^{th}$ pixel, such that these are set to unity, and transmitting compressed image data over a media to a receiver; and reconstructing image data I'ij using a Lagrange multiplier $\gamma_k$ using:

$$I'_{ij} = p_{ij} \exp\left[-\sum_{k=1}^{N} \lambda_k W_{ijk}\right]$$

Where values of the Langrange multipliers are determined from the solution of the set of N equations, $$\langle E\rangle_k = \sum_i \sum_j \exp\left[-\sum_{n=1}^{N} \lambda_n W_{ijn}\right] W_{ijk} = 0,$$

for $k = 1, 2, \ldots N$ and prior to compressing images and reconstruction them, N compression functions are $W_k(x,y)$ for k=1,2, . . . N.

* * * * *